United States Patent [19]
Meuschke et al.

[11] 4,299,658
[45] Nov. 10, 1981

[54] RADIATION SHIELD RING ASSEMBLY AND METHOD OF DISASSEMBLING COMPONENTS OF A NUCLEAR STEAM GENERATOR USING SUCH ASSEMBLY

[75] Inventors: Robert E. Meuschke, Pittsburgh; Donald L. Wolfe, Allison Park, both of Pa.

[73] Assignee: Westinghouse Electric Corp., Pittsburgh, Pa.

[21] Appl. No.: 53,447

[22] Filed: Jun. 29, 1979

[51] Int. Cl.$^3$ ............................................. B23P 19/04
[52] U.S. Cl. ................................ 250/506; 29/157.4; 376/260
[58] Field of Search ........................... 176/27, 30, 65; 29/400 N, 157.4, 426; 250/506

[56] References Cited
U.S. PATENT DOCUMENTS
4,199,857  4/1980  Meuschke ........................... 176/65

Primary Examiner—Donald P. Walsh
Attorney, Agent, or Firm—E. F. Possessky

[57] ABSTRACT

This invention provides shielded access to the irradiated heat exchanger tube bundle of a nuclear steam generator contained within a cask after removal from the generator. This tube bundle must be reduced in size and confined for removal from the containment building through hatchways of generally limited size. Access to the enclosed bundle is at the flanged joints of adjacent sections forming the cask and which are vertically separated to permit an oxygen lance to be inserted therein for burning the tubes at that level. A rotatably supported annular seal ring covers the separation and shields against the escape of radiation or irradiated material during the burning process. The ring provides access ports through which roller supports are mounted on the cask and provide access of the cutting tool to the tubes. Rotation of the ring on the rollers permits the tool to be inserted completely around the cask. After the tubes within one section of the cask are severed, the tubes and that portion of the cask are removed and the ring raised to a next position where the procedure is repeated.

7 Claims, 7 Drawing Figures

RADIATION SHIELD RING ASSEMBLY AND METHOD OF DISASSEMBLING COMPONENTS OF A NUCLEAR STEAM GENERATOR USING SUCH ASSEMBLY

BACKGROUND OF THE INVENTION

1. Field of the Invention

This invention relates to an apparatus and a method for cutting, within a shielding confinement, the irradiated components of a nuclear steam generator to reduce such components to a size to permit their subsequent removal from the containment structure of the generator.

2. Description of the Prior Art

The general method of retubing a vertically oriented nuclear steam generator is described in copending U.S. Patent Application Ser. No. 974,161 of common assignee. This retubing requires removing from the steam generator vessel the U-shaped heat exchanger tube bundle. As this bundle is too large to be removed in one piece from the containment structure through the limited sized equipment hatch and is also irradiated, it is necessary to cut the tube bundle into portions of a size that can be removed. The personnel doing the manual labor must be shielded from the irradiated tubes, and the tubes must also continue to be confined, even after cutting into removable sections, in a shielded structure so that they can be removed from the containment structure for further disposal.

A previous method and apparatus for accomplishing this function is shown and described in copending commonly assigned U.S. Application Ser. No. 901,659 filed May 1, 1978. As described therein, the access port in the cask for the cutting tool remains stationary and substantially open. As a result it would be necessary for the tube bundle and wrapper housed therein to be rotated, relative to the cask, for complete exposure to the cutting tool projecting through the port. Also, the workmen would be exposed to the irradiated tubes and resulting combination gases during the cutting process through the open port.

SUMMARY OF THE INVENTION

The present invention utilizes the sectionalized cylindrical cask into which the tube bundle, or the bundle and wrapper assembly, is placed during removal from the nuclear steam generator in accordance with the above-identified application. A segmented annular seal ring is exteriorly supported (as with a crane, not shown) in alignment with the lowermost flange joing of the sectionalized cask and has an axial dimension such that the abutting flanges can be vertically separated a predetermined amount with the ring bridging the separation. The ring includes a first aperture having a removable seal plate which permits the insertion therethrough of a spacer/roller assembly to be disposed between the separated flanges to maintain the spatial relationship. Each roller assembly includes an outwardly projecting roller engaging the inner projecting collar of the ring and, with a plurality of such roller assemblies placed therebetween in angularly spaced positions, the ring is supported (i.e. without aid from the crane) for a 360° rotation about the cask. A second aperture is provided in the ring which is generally covered by an access plate that is movably attached to the ring to define various size openings therethrough for minimum clearance to insert an oxygen lance burning tool. Lead glass viewing ports are provided on both sides of the access port. The oxygen lance is used to burn to the center of the bundle and then is withdrawn. The shield ring is rotated and the burning procedure repeated at a new angular position until the entire bundle or bundle and wrapper is cut through at the level of the lowermost flanged joint. Cover members are then provided to enclose the cask section containing the burned off portion of tubes which is then available for removal from the containment structure. The shield ring is then lifted to the next lowermost flanged joint of the cask and the procedure repeated. This process continues until the entire tube bundle has been cut into separate portions each of which is enclosed in a sealed section of the cask.

BRIEF DESCRIPTION OF THE DRAWINGS

FIG. 5 is an elevational, cross-sectional view showing the parts as assembled.

DESCRIPTION OF THE PREFERRED EMBODIMENT

The procedure for removing the used heat exchange tube bundle from the nuclear steam generator and enclosing the bundle, with or without an attached cylindrical wrapper, in a sectionalized cylindrical cask for subsequent sectioning into portions of a size that can be removed through the equipment hatch of the nuclear steam generator containment is shown and described in previously identified Application Ser. No. 901,659 which is herein incorporated by reference for such description.

However, in accordance with the procedure of the present invention, the cask sections are separated at adjacent flanges and an oxygen lance burning rod is inserted to burn a parting line in the tubes (and the tube wrapper if it also is removed with the bundle) on the plane of the flange. As this proceeds from the lowermost cask section on up, the lowermost portion is removed, and a cover is placed on both ends of the cask section containing the burned off tubes thus providing a container so the tubes therein can be removed from the containment structure.

A primary problem that this poses is the protection of the personnel from being exposed to the irradiated tubes during the burning operation. In this regard a radiation shield ring is employed to cover the vertical gap provided upon separation of the adjacent cylindrical sections of the cask at their flange joints. The ring provides access ports for the oxygen lance and viewing ports for viewing the operation and is supported on rollers so that it can be rotated 360° about the cask for complete access to the enclosed tubes by the oxygen lance from the single access port.

Figure 1:
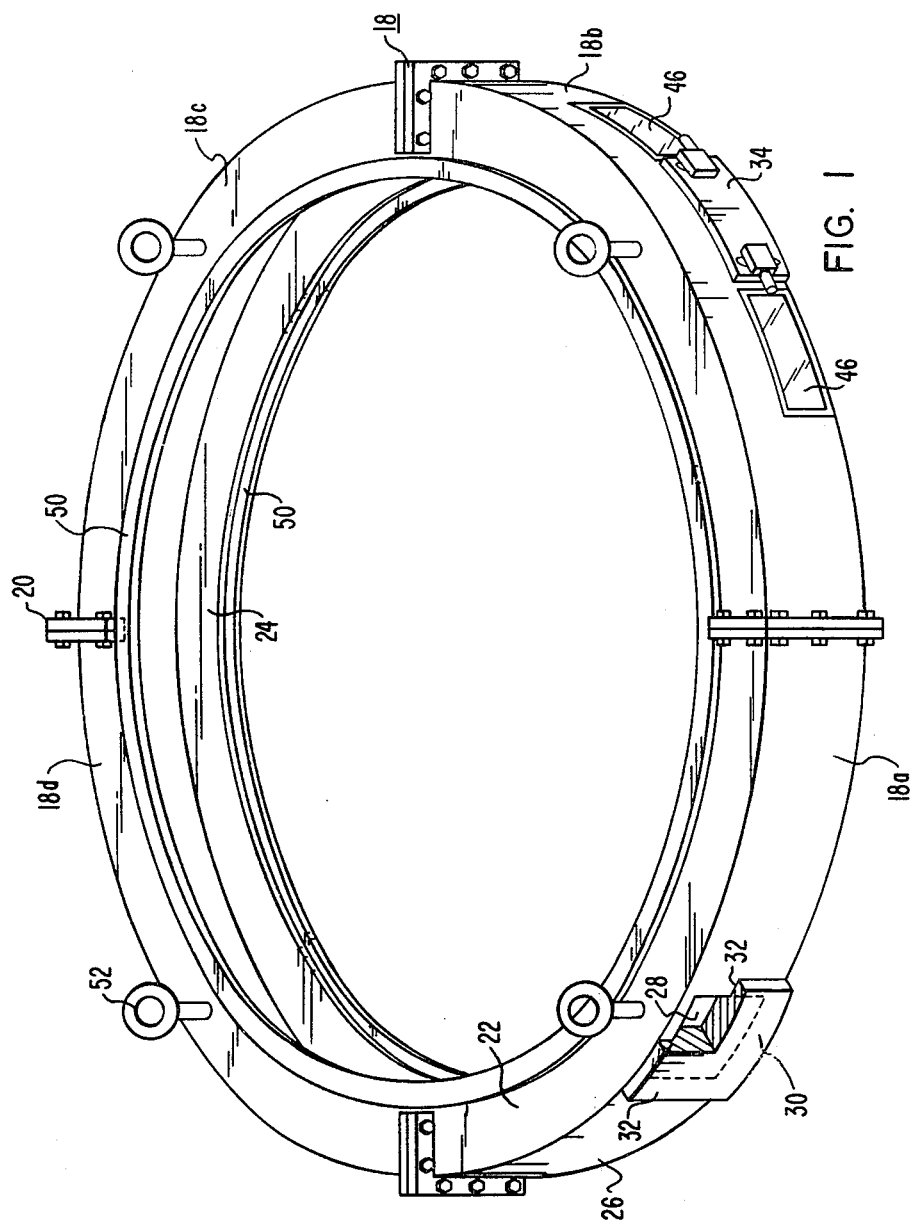
FIG. 1 is an isometric view of the segmented radiation shield ring assembly of the present invention.
Figure 2:
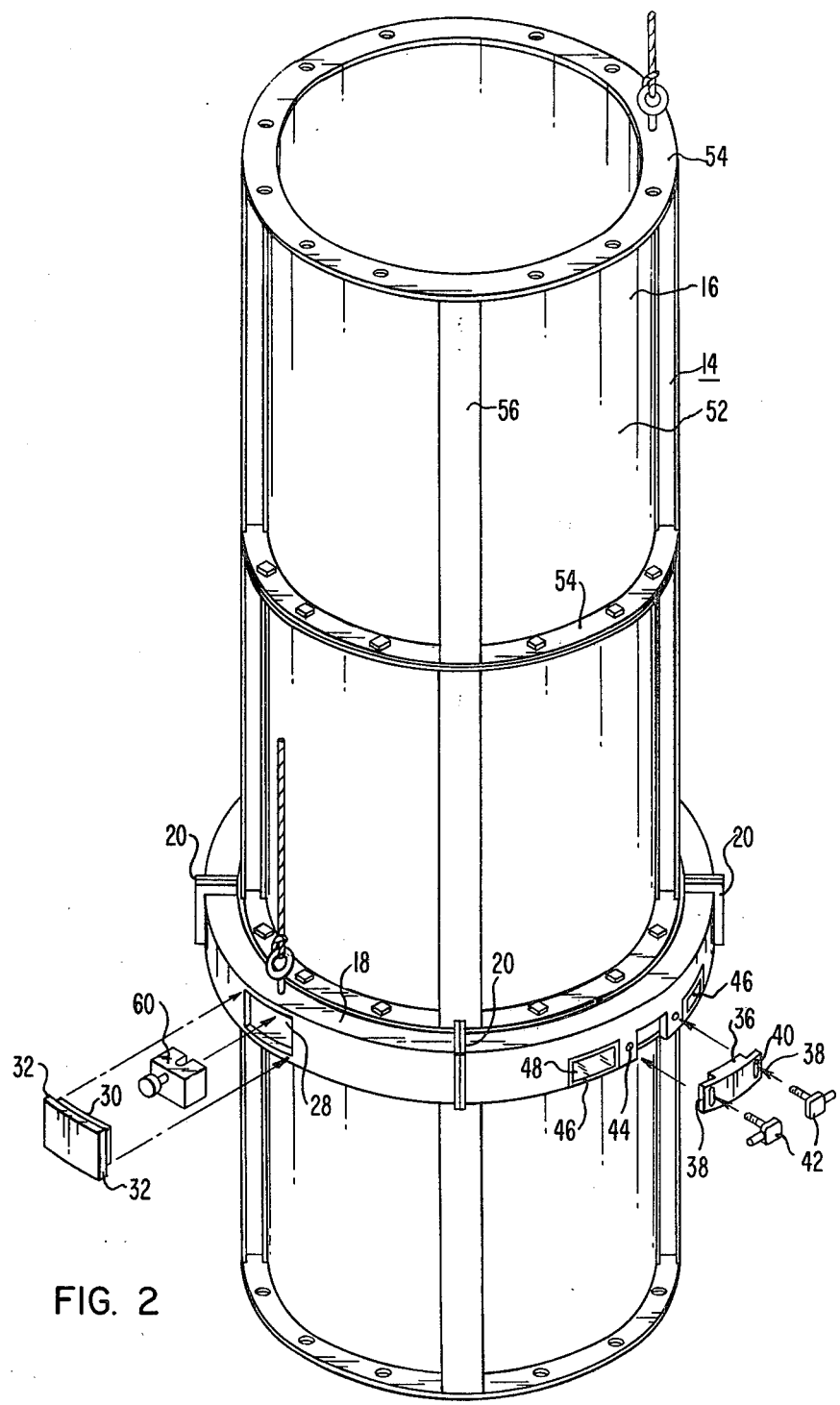
FIG. 2 is an isometric view of the shield ring disposed in position on the cask, and with certain components exploded outwardly to a preassembled position.

Referring initially to FIGS. 1 and 2 an isometric view of the segmented radiation shield ring 18 is shown. The ring 18 comprises four substantially similar quarter-circular segments 18(a), 18(b), 18(c) and 18(d) which, when bolted together at their abutting bolt flanges 20, form a complete ring. The ring 18 is generally C-shaped in cross-section as defined by upper 22 and lower 24 opposed flanges extending inwardly from the vertical web portion 26.

One segment 18a of the ring 18 contains an aperture 28 extending substantially across the height of the web portion 26. A T-shaped plate member 30, is sized to snugly fit within the aperture 28 with the overhanging lip portions 32 thereof abutting the external face of the web 26 for securing the plate member to the ring as either by tack welding or bolting.

Another segment 18b of the ring 18 has an aperture 34 that extends from generally mid-height of the web 26 and is open through the lower flange 24. A second T-shaped insert 36 (see FIG. 2) is supported therein and is sized so as to snugly fit within the aperture 34 and also has opposed overhanging lips 38 again abutting the external face of the web 26. Lips 38 contain elongated slots 40 through which manually threaded bolts 42 extend into threaded openings 44 on each side of the aperture 34. Thus, the insert 36 can be retained in a position substantially closing the aperture 34 or, it can be lowered to a retained position exposing the aperture 34 and providing access therethrough.

Viewing ports 46 are provided on both sides of the aperture 34 and each comprises an opening through the web portion 26 which is filled with a leaded glass lens 48 for viewing therethrough. The radially inner face of both the upper 22 and lower 24 flanges supports an annular rubber-like sealing collar 50 extending therefrom. Also, each of the quarter-circular segments of the ring 18 includes an eye bolt 52 or the like for lifting the ring 18 from the cables of a crane (not shown).

FIG. 2 shows the ring 18 encircling the tube bundle enclosing cask 14 in a position ready for use. Initially the ring 18 is supported in such position by the cables from the crane, but, as later described, the ring is rotatively supported on rollers attached to the cask.

Figure 3:
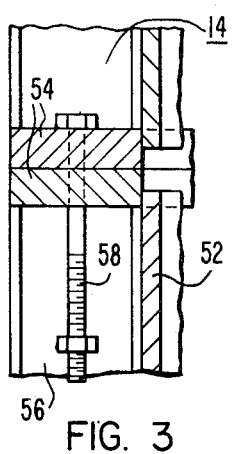
FIGS. 3–7 are elevational cross-sectional views of a portion of the seal ring and cask at the flanged joint and showing the steps for mounting the ring on the cask at a flanged joint.
Figure 4:
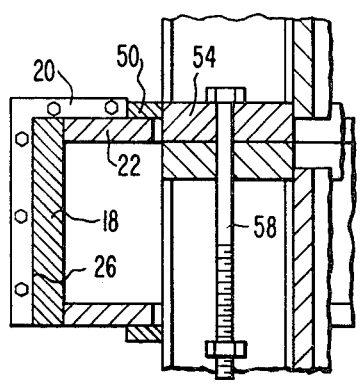
Figure 5:
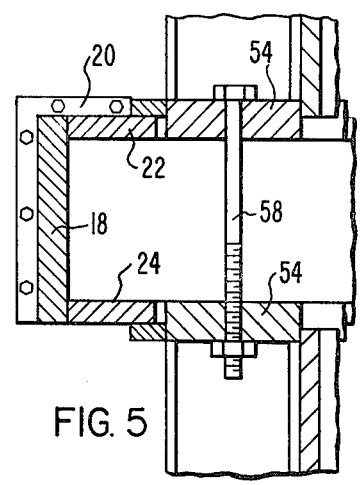

Referring to FIGS. 3–5 the steps of mounting the ring 18 on the cask is shown. It is seen that, as described in the incorporated application, each section of the cask 14 includes a cylindrical wall portion 52 having, on opposed ends, outwardly projecting annular flanges 54 and vertically oriented support beams 56 extending between the flanges. The flanges 54 of adjacent sections 52 are bolted together to provide the unitary cask.

Also it is seen that the shield ring 18 is sized so as to pass over the flanges 54 with the rubber seal 50 in wiping sealing engagement therewith.

With the cask 14 resting on the floor of the containment structure and containing the tube bundle as previously explained, elongated bolts 58 are inserted at the lowermost flanged joint of the cask (i.e. the bolts are on the order of 13 inches or so). Once this is done, the upper flange 22 of the ring 18 is positioned flush with the upper face of the top flange 54 of the lowermost flange joint and both the ring 18 and the upper sections of the cask are raised (as by the crane) simultaneously to maintain this flush relationship, until the lower flange 24 of the ring 18 is generally flush with the lower face of the flange 54 on the bottom cask section. Thus, the previously joined adjacent sections have now been separated a predetermined distance (on the order of approximately 9 inches) providing an annular space that is enclosed or bridged by the shield ring 18 (and because of the simultaneous lifting, during the separation, the internal space is continuously shielded by the ring).

Figure 6:
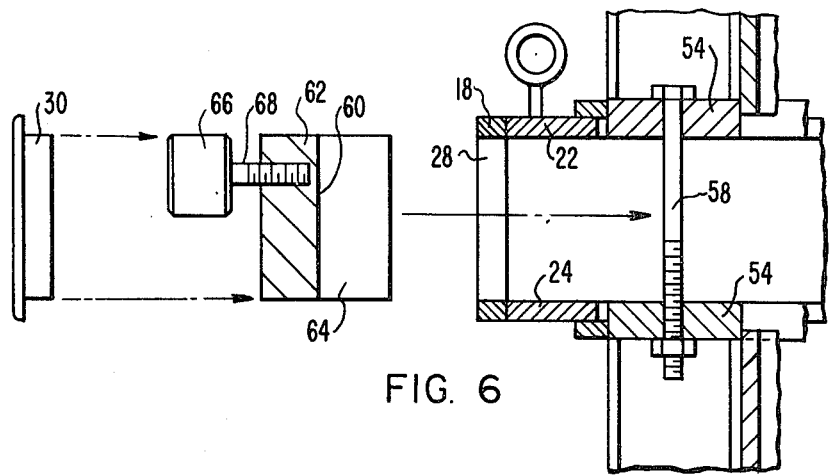
Figure 7:
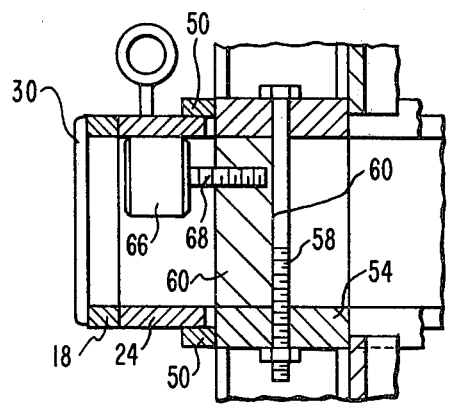

Thus, the separated flanges 54 of adjacent sections 16 of the cask and the flanges 22, 24 of the shield ring 18 are ultimately in the orientation shown in FIG. 6 as supported in this position by the crane. In this position the patch plate 30 is removed from the ring 18 and a roller assembly 60 is inserted through the opening 28. As seen in FIGS. 2 and 7 the roller assembly 60 comprises a block 62 having an open vertical slot 64 throughout its height on one face and having a roller 66 disposed outwardly on an axle 68 extending horizontally from the opposite face. The roller assembly 60 is sized to be received through the opening 28 in the ring 18 and inserted in the vertical space between the separated flanges 54. As seen in FIG. 7 the roller assembly is moved inwardly in alignment with the elongated bolt 58 until the bolt is seated within the slot 64. In this position the roller extends outwardly from the flanges 54 to a position to engage the lower face of the upper flange 22 of the ring 18. After inserting the roller assembly 60, the patch plate 30 is replaced and the seal ring rotated (as still supported by the crane) until a plurality of such roller assemblies 60 are in place (i.e. on the order of 8 equi-angularly spaced assemblies). Once the desired number of the roller assemblies 60 are in place the cask sections and seal ring 18 can be released from the crane and the spatial separation is maintained by the blocks 62, and the ring 18 is supported in proper alignment on the rollers 66 for rotatable movement about the cask. As is further seen, the sealing collars 50 are in wiping engagement with the flanges 54 to maintain a sealed relationship between the ring 18 and the interior of the cask.

With the shield ring 18 thus properly disposed, the access port 34 can be opened by lowering the insert 36 and an oxygen lance burning rod inserted therethrough to burn the tubes within the cask section at this plane. The shield ring 18 is rotated on the rollers 66 to make successive burns at various angular positions with the second paths of the burn being deeper than the first and continuing until all the tubes have been completely severed at this plane. In doing so, the shield ring 18 and the wiping seals 50 contain all combustion products within the cask, minimizing the exposure of the personnel manipulating the lance to the irradiated material and atmosphere. After this operation is completed, the cask section containing the severed portion of the tubes is enclosed by a cover member (not shown), the radiation seal ring is again supported by the crane, the roller assemblies are removed and the ring is elevated to the next lowermost flange joint of the cask for the procedure to be repeated until all the tube bundle has been cut and contained within the separate sections of the cask.

We claim:

1. Apparatus for enclosing irradiated components removed from a nuclear steam generator and providing generally shielded access thereto for separating said components into smaller sizes, said apparatus comprising;

a container for enclosing said apparatus formed by a plurality of sections, each section having an external flange adjacent each end for securing to a like flange of the adjacent section;

a movable shield ring assembly encircling said container at an interface of adjacent flanges;

a plurality of roller means removably mounted to said container and interposed between said adjacent flanges to maintain said flanges separated and support said ring assembly thereon for rotatable movement about said container; and wherein, said ring assembly is sized to completely cover said flange separation and defines a plurality of generally covered ports for access therethrough to and into the container, including access of cutting equipment to said irradiated components.

2. Structure according to claim 1 wherein said movable shield ring assembly defines an annular channel shaped ring open towards the container and defining opposed generally horizontal flanges and a vertical web portion and wherein said roller means comprises a plurality of rollers mounted so as to extend outwardly from said container and rollingly engage the inner horizontal face of the uppermost flange whereby said annular ring is rotatable about said container as supported thereby.

3. Structure according to claim 2 wherein said roller means includes a block portion having a vertical notch therein for indexed receipt of an elongated bolt joining said flanges in said spaced relation such that tightening said bolts secures said roller means therein.

4. Structure according to claim 3 wherein one of said apertures includes an opening through said web portion for passing said roller means therethrough and into the gap between spaced adjacent flanges; and, replaceable cover means removably secured to said web portion to close said opening.

5. Structure according to claim 4 wherein at least another of said apertures is covered by a plate member secured to said web portion, and means for retaining said plate member on said web at various positions from fully closed to an open position permitting access of said cutting tool through said another aperture.

6. A method of cutting irradiated components confined within a sectionalized container by providing generally shielded access to said components from exteriorly of said container comprising the steps of:
 1. enclosing the interface of adjacent sections of said container by an external annular movable ring having movable plates covering access ports therethrough;
 2. separating said adjacent sections a predetermined distance which is completely bridged by and at all times enclosed by said ring;
 3. inserting support blocks at angular locations between said adjacent sections through an aperture in said ring exposed by removing one plate to maintain said spatial separation, said support block having roller extending therefrom to rotatingly support said ring;
 4. replacing said removed plate;
 5. exposing a generally closed port sufficient to insert a cutting tool therethrough and through said spatial separation for cutting access to said components;
 6. inserting said tool and cutting said components generally along the plane of said spatial separation;
 7. withdrawing the tool and closing the aperture;
 8. removing the support blocks; and,
 9. placing said ring over the next interface of adjacent sections to repeat the process.

7. The method of claim 6 wherein during said cutting operation said ring is rotated about said container for complete access to said components through one aperture.

* * * * *